(12) United States Patent
Tomlinson

(10) Patent No.: US 10,008,974 B2
(45) Date of Patent: Jun. 26, 2018

(54) MOUNTING SYSTEM FOR PHOTOVOLTAIC ARRAYS

(71) Applicant: PV Solutions, LLC, Santa Monica, CA (US)

(72) Inventor: Joseph Tomlinson, Park City, UT (US)

(73) Assignee: PV Solutions, LLC, Santa Monica, CA (US)

( * ) Notice: Subject to any disclaimer, the term of this patent is extended or adjusted under 35 U.S.C. 154(b) by 156 days.

(21) Appl. No.: 14/853,642

(22) Filed: Sep. 14, 2015

(65) Prior Publication Data

US 2016/0049898 A1  Feb. 18, 2016

Related U.S. Application Data

(63) Continuation-in-part of application No. 13/602,161, filed on Sep. 2, 2012, now Pat. No. 9,136,792.

(60) Provisional application No. 61/530,553, filed on Sep. 2, 2011.

(51) Int. Cl.
| | |
|---|---|
| *F16M 11/00* | (2006.01) |
| *H02S 20/10* | (2014.01) |
| *H02S 20/23* | (2014.01) |
| *H02S 20/00* | (2014.01) |
| *F24J 2/52* | (2006.01) |

(52) U.S. Cl.
CPC .............. *H02S 20/10* (2014.12); *H02S 20/00* (2013.01); *H02S 20/23* (2014.12); *F24J 2/5205* (2013.01); *Y02B 10/12* (2013.01); *Y02E 10/50* (2013.01)

(58) Field of Classification Search
CPC .............................. B60J 3/0217; F16M 13/00
See application file for complete search history.

(56) References Cited

U.S. PATENT DOCUMENTS

| | | |
|---|---|---|
| 3,360,491 A | 12/1967 | Axon |
| 4,249,514 A | 2/1981 | Jones |
| 4,321,745 A | 3/1982 | Ford |
| 4,993,959 A | 2/1991 | Randolph |
| 5,121,583 A | 6/1992 | Hirai et al. |
| 5,451,167 A | 9/1995 | Zielinski et al. |
| 6,088,688 A | 7/2000 | Crooks et al. |
| 6,105,317 A | 8/2000 | Tomiuchi et al. |
| 6,360,491 B1 | 3/2002 | Ullman |
| 6,380,481 B1 | 4/2002 | Muller |
| 6,672,018 B2 | 1/2004 | Shingleton |

(Continued)

FOREIGN PATENT DOCUMENTS

| | | |
|---|---|---|
| CA | 2762078 | 6/2013 |
| CN | 201070989 | 6/2008 |

(Continued)

OTHER PUBLICATIONS

Brooks, et al., "Evaluation of Four Geomembrane-Mounted PV Systems for Land Reclamation in Southern Arizona," Journal of Energy and Power Engineering, 2013, vol. 7, pp. 834-840.

(Continued)

*Primary Examiner* — Amy J. Sterling
(74) *Attorney, Agent, or Firm* — Sheridan Ross P.C.

(57) ABSTRACT

Photovoltaic (PV) systems are disclosed, to include mounting brackets and mounting systems. In one embodiment, a PV array mounting system with brackets comprising pairs of panel connectors and panel connector receivers is disclosed.

16 Claims, 15 Drawing Sheets

(56) References Cited

U.S. PATENT DOCUMENTS

| | | | |
|---|---|---|---|
| 6,799,743 B2 * | 10/2004 | Sawayanagi | B60J 3/0217 248/224.8 |
| 7,293,824 B2 * | 11/2007 | Dobson | B60J 3/0217 296/214 |
| 7,307,209 B2 | 12/2007 | Mapes et al. | |
| 7,406,800 B2 | 8/2008 | Cinnamon et al. | |
| 7,592,537 B1 | 9/2009 | West | |
| 7,600,349 B2 | 10/2009 | Liebendorfer | |
| 7,694,466 B2 | 4/2010 | Miyamoto et al. | |
| 7,741,727 B2 | 6/2010 | Fein et al. | |
| 7,832,157 B2 | 11/2010 | Cinnamon | |
| 7,866,098 B2 | 1/2011 | Cinnamon | |
| 7,925,552 B2 | 4/2011 | Tarbell et al. | |
| 7,956,280 B2 | 6/2011 | Kobayashi | |
| 7,979,166 B2 | 7/2011 | Yamada et al. | |
| 7,987,641 B2 | 8/2011 | Cinnamon | |
| 8,039,733 B2 | 10/2011 | Kobayashi | |
| 8,092,129 B2 | 1/2012 | Wiley et al. | |
| 8,146,299 B2 | 4/2012 | Stearns et al. | |
| 8,176,693 B2 | 5/2012 | Abbott et al. | |
| 8,192,233 B2 | 6/2012 | Duesterhoeft et al. | |
| 8,196,360 B2 | 6/2012 | Metten et al. | |
| 8,220,569 B2 | 7/2012 | Hassan | |
| 8,240,109 B2 | 8/2012 | Cusson et al. | |
| 8,256,170 B2 | 9/2012 | Plaisted et al. | |
| 8,303,357 B2 | 11/2012 | Kuwahara | |
| 8,316,590 B2 | 11/2012 | Cusson | |
| 8,418,983 B2 | 4/2013 | Hartelius et al. | |
| 8,448,405 B2 | 5/2013 | Schaefer et al. | |
| 8,475,185 B2 | 7/2013 | Rivera et al. | |
| 8,495,997 B1 | 7/2013 | Laubach | |
| 8,571,922 B2 | 10/2013 | Zaloom | |
| 8,644,995 B2 | 2/2014 | Hinman et al. | |
| 8,661,765 B2 | 3/2014 | Schaefer et al. | |
| 1,881,344 A1 | 8/2014 | Rizzo | |
| 8,919,052 B2 | 12/2014 | West | |
| 8,938,919 B2 | 1/2015 | Cinnamon et al. | |
| 9,136,792 B2 | 9/2015 | Tomlinson | |
| 9,142,967 B2 | 9/2015 | Tomlinson | |
| 9,395,103 B2 | 7/2016 | Conley et al. | |
| 2006/0119106 A9 | 6/2006 | Borden et al. | |
| 2007/0120390 A1 * | 5/2007 | Wheeler | B60J 3/0217 296/97.9 |
| 2007/0295391 A1 | 12/2007 | Lenox et al. | |
| 2008/0234421 A1 | 9/2008 | Hart et al. | |
| 2008/0265112 A1 | 10/2008 | Pascual et al. | |
| 2009/0250580 A1 | 10/2009 | Strizki | |
| 2009/0255573 A1 | 10/2009 | Taylor | |
| 2010/0138377 A1 | 6/2010 | Wright et al. | |
| 2010/0170163 A1 | 7/2010 | Tarbell et al. | |
| 2010/0192505 A1 | 8/2010 | Schaefer et al. | |
| 2010/0193012 A1 | 8/2010 | Klammer et al. | |
| 2010/0193260 A1 | 8/2010 | Freeman | |
| 2010/0207452 A1 | 8/2010 | Saab | |
| 2010/0224227 A1 | 9/2010 | Lindsey | |
| 2010/0228415 A1 | 9/2010 | Paul | |
| 2010/0236183 A1 | 9/2010 | Cusson et al. | |
| 2010/0278592 A1 | 11/2010 | Walker | |
| 2010/0294343 A1 | 11/2010 | Wexler et al. | |
| 2010/0314935 A1 | 12/2010 | Reichart et al. | |
| 2011/0025267 A1 | 2/2011 | Kamen et al. | |
| 2011/0031814 A1 | 2/2011 | Giesler | |
| 2011/0037600 A1 | 2/2011 | Takehara et al. | |
| 2011/0047903 A1 | 3/2011 | Kobayashi | |
| 2011/0072631 A1 | 3/2011 | Hartelius et al. | |
| 2011/0137752 A1 | 6/2011 | Arfom | |
| 2011/0138377 A1 | 6/2011 | Allen | |
| 2011/0151703 A1 | 6/2011 | Parker et al. | |
| 2011/0153098 A1 | 6/2011 | Tomita et al. | |
| 2011/0162779 A1 | 7/2011 | Stanley | |
| 2011/0173110 A1 | 7/2011 | Tarbell et al. | |
| 2011/0214366 A1 | 9/2011 | Haddock et al. | |
| 2011/0248137 A1 | 10/2011 | Barba | |
| 2011/0284058 A1 | 11/2011 | Cinnamon | |
| 2011/0308566 A1 | 12/2011 | Johnson | |
| 2012/0022711 A1 | 1/2012 | Sakaguchi et al. | |
| 2012/0045286 A1 | 2/2012 | Oliveira | |
| 2012/0073885 A1 | 3/2012 | Glynn | |
| 2012/0085387 A1 | 4/2012 | French, Sr. | |
| 2012/0085394 A1 | 4/2012 | McPheeters et al. | |
| 2012/0102332 A1 | 4/2012 | Mullin | |
| 2012/0110931 A1 | 5/2012 | Eiffert et al. | |
| 2012/0125410 A1 | 5/2012 | West et al. | |
| 2012/0144828 A1 | 6/2012 | Lazaris | |
| 2012/0158205 A1 | 6/2012 | Hinman et al. | |
| 2012/0192926 A1 | 8/2012 | Kambara et al. | |
| 2012/0233958 A1 | 9/2012 | Stearns | |
| 2012/0255598 A1 | 10/2012 | West | |
| 2012/0260972 A1 | 10/2012 | West et al. | |
| 2012/0271576 A1 | 10/2012 | Kamel et al. | |
| 2012/0279558 A1 | 11/2012 | West et al. | |
| 2012/0298186 A1 | 11/2012 | West | |
| 2012/0298188 A1 | 11/2012 | West et al. | |
| 2012/0323635 A1 | 12/2012 | Arlin et al. | |
| 2012/0325290 A1 | 12/2012 | Gizara | |
| 2013/0061142 A1 | 3/2013 | Brier et al. | |
| 2013/0061189 A1 | 3/2013 | Brier et al. | |
| 2013/0061198 A1 | 3/2013 | Brier et al. | |
| 2013/0133270 A1 | 5/2013 | West et al. | |
| 2013/0140416 A1 | 6/2013 | West et al. | |
| 2013/0146554 A1 | 6/2013 | Berry | |
| 2013/0167907 A1 | 7/2013 | Bitarchas et al. | |
| 2013/0180572 A1 | 7/2013 | West | |
| 2013/0180573 A1 | 7/2013 | West | |
| 2013/0180574 A1 | 7/2013 | West et al. | |
| 2013/0183084 A1 | 7/2013 | West et al. | |
| 2013/0192150 A1 | 8/2013 | DuPont et al. | |
| 2013/0200234 A1 | 8/2013 | Zhao et al. | |
| 2013/0213038 A1 | 8/2013 | Lazaris | |
| 2013/0262040 A1 | 10/2013 | Buckley | |
| 2014/0000916 A1 | 1/2014 | Ryba-White et al. | |
| 2014/0020230 A1 | 1/2014 | Jolley | |
| 2014/0020244 A1 | 1/2014 | Carlson et al. | |
| 2014/0025215 A1 | 1/2014 | Carlson et al. | |
| 2014/0025220 A1 | 1/2014 | Carlson et al. | |
| 2014/0025344 A1 | 1/2014 | Brier et al. | |
| 2014/0026946 A1 | 1/2014 | West et al. | |
| 2014/0032178 A1 | 1/2014 | Kicinski et al. | |
| 2014/0053891 A1 | 2/2014 | West et al. | |
| 2014/0102997 A1 | 4/2014 | West et al. | |
| 2014/0127935 A1 | 5/2014 | Scott et al. | |
| 2014/0130847 A1 | 5/2014 | West et al. | |
| 2014/0158184 A1 | 6/2014 | West et al. | |
| 2014/0174511 A1 | 6/2014 | West et al. | |
| 2014/0175244 A1 | 6/2014 | West et al. | |
| 2014/0182661 A1 | 7/2014 | Kinyon | |
| 2014/0182662 A1 | 7/2014 | West et al. | |
| 2014/0220834 A1 | 8/2014 | Rizzo | |
| 2014/0223838 A1 | 8/2014 | West et al. | |
| 2014/0246549 A1 | 9/2014 | West et al. | |
| 2014/0251431 A1 | 9/2014 | West et al. | |
| 2014/0290155 A1 | 10/2014 | Conger | |
| 2014/0326838 A1 | 11/2014 | West et al. | |
| 2014/0338729 A1 | 11/2014 | Newman et al. | |
| 2014/0360562 A1 | 12/2014 | Hartelius | |
| 2015/0013756 A1 | 1/2015 | West et al. | |
| 2015/0153394 A1 | 6/2015 | Carlson et al. | |
| 2015/0200618 A9 | 7/2015 | West et al. | |
| 2016/0006252 A1 | 1/2016 | Tomlinson | |
| 2016/0226434 A1 | 8/2016 | Tomlinson | |

FOREIGN PATENT DOCUMENTS

| | | |
|---|---|---|
| CN | 101619711 | 1/2010 |
| CN | 202081585 | 12/2011 |
| EP | 0544625 | 6/1993 |
| EP | 0905795 | 3/1999 |
| FR | 2957953 | 9/2011 |
| WO | WO 00/12839 | 3/2000 |

(56) References Cited

FOREIGN PATENT DOCUMENTS

| WO | WO 2007/093421 | 8/2007 |
|---|---|---|
| WO | WO 2010/082653 | 7/2010 |

OTHER PUBLICATIONS

Chaudhry, et al., "A V2G Application using DC Fast Charging and its Impact on the Grid," IEEE Transportation Electrification Conference and Expo, 2012, 6 pages.
Sampson, "Solar Power Installations on Closed Landfills: Technical and Regulatory Considerations," U.S. Environmental Protection Agency, 2009, 36 pages.
International Search Report and Written Opinion for International (PCT) Patent Application No. PCT/US12/63570, dated Nov. 16, 2012, 9 pages.
International Preliminary Report on Patentability for International (PCT) Patent Application No. PCT/US12/63570, dated Mar. 3, 2014, 7 pages.
Extended European Search Report for European Patent Application No. 12828760.4, dated Apr. 29, 2015, 8 pages.
International Search Report and Written Opinion for International (PCT) Patent Application No. PCT/US12/53604, dated Nov. 26, 2012, 7 pages.
International Preliminary Report on Patentability for International (PCT) Patent Application No. PCT/US12/53604, dated Mar. 4, 2014, 6 pages.
Official Action for U.S. Appl. No. 13/602,161, dated Jul. 29, 2014, 19 pages.
Notice of Allowance for U.S. Appl. No. 13/602,161, dated Apr. 24, 2015, 9 pages.
Notice of Allowance for U.S. Appl. No. 13/602,392, dated May 20, 2015, 21 pages.
Notice of Allowance (no English translation) for Mexica Patent Application No. MX/a/2014/002539, dated Jan. 10, 2017, 1 page.
Official Action for U.S. Appl. No. 14/855,683, dated Sep. 20, 2017, 12 pages, Restriction Requirement.
International Search Report and Written Opinion for International (PCT) Patent Application No. PCT/US16/15390, dated Jul. 15, 2016, 10 pages.
International Preliminary Report on Patentability for International (PCT) Patent Application No. PCT/US16/15390, dated Aug. 10, 2017. 7 pages.
Official Action for U.S. Appl. No. 15/009,265, dated Nov. 7, 2016, 8 pages, Restriction Requirement.
Official Action for U.S. Appl. No. 15/009,265, dated Dec. 15, 2016, 15 pages.
Notice of Allowance for U.S. Appl. No. 15/009,265, dated Aug. 2, 2017, 7 pages.

* cited by examiner

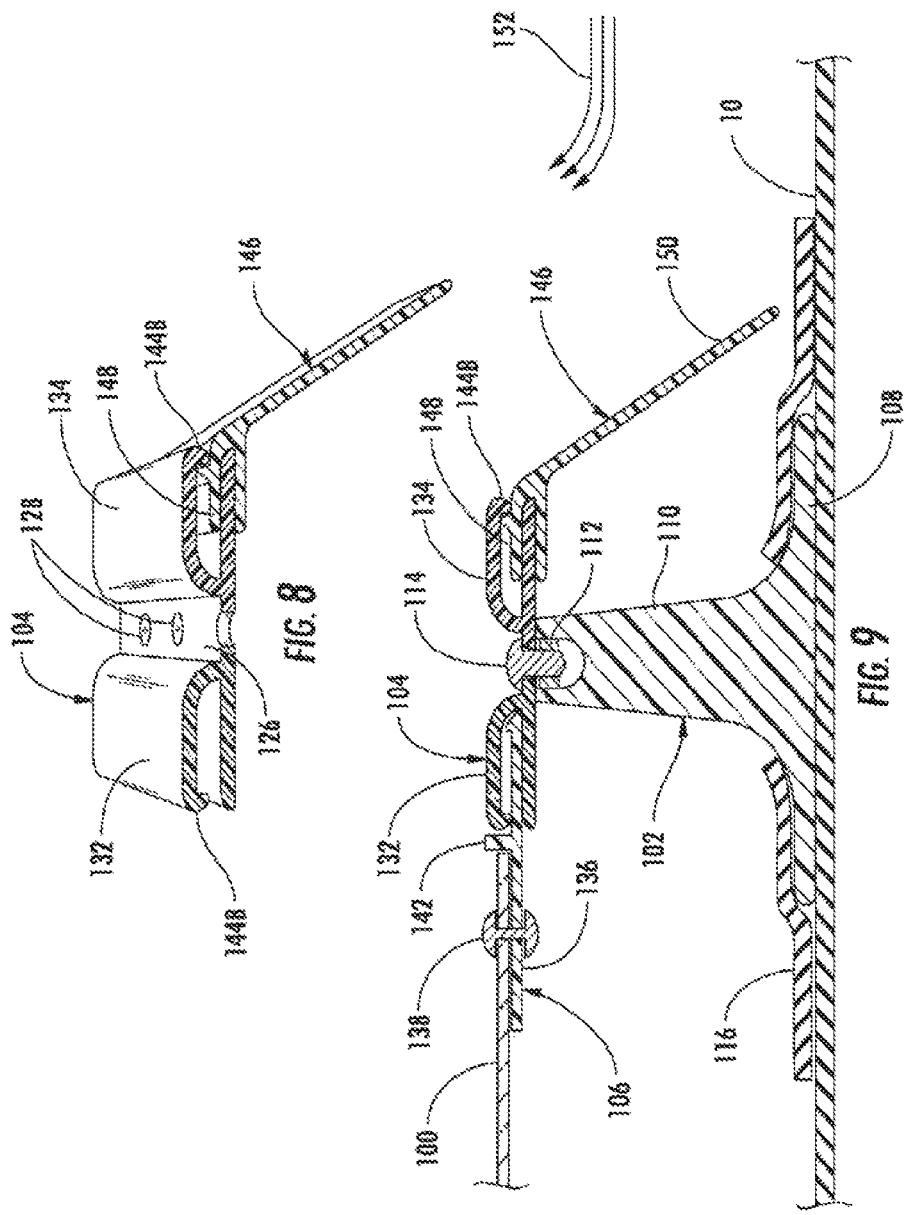

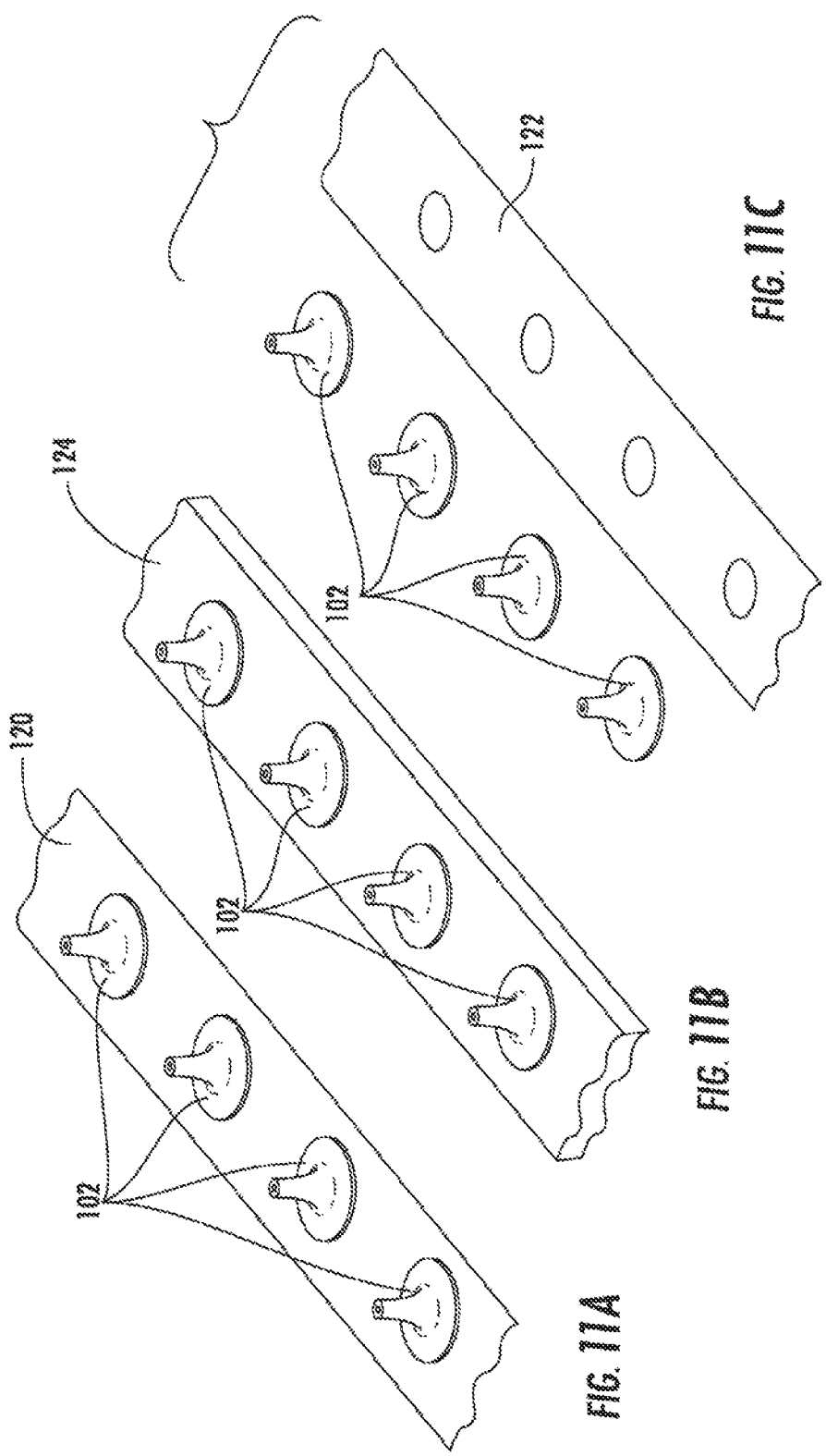

SECTION A-A

SECTION C-C

SECTION B-B

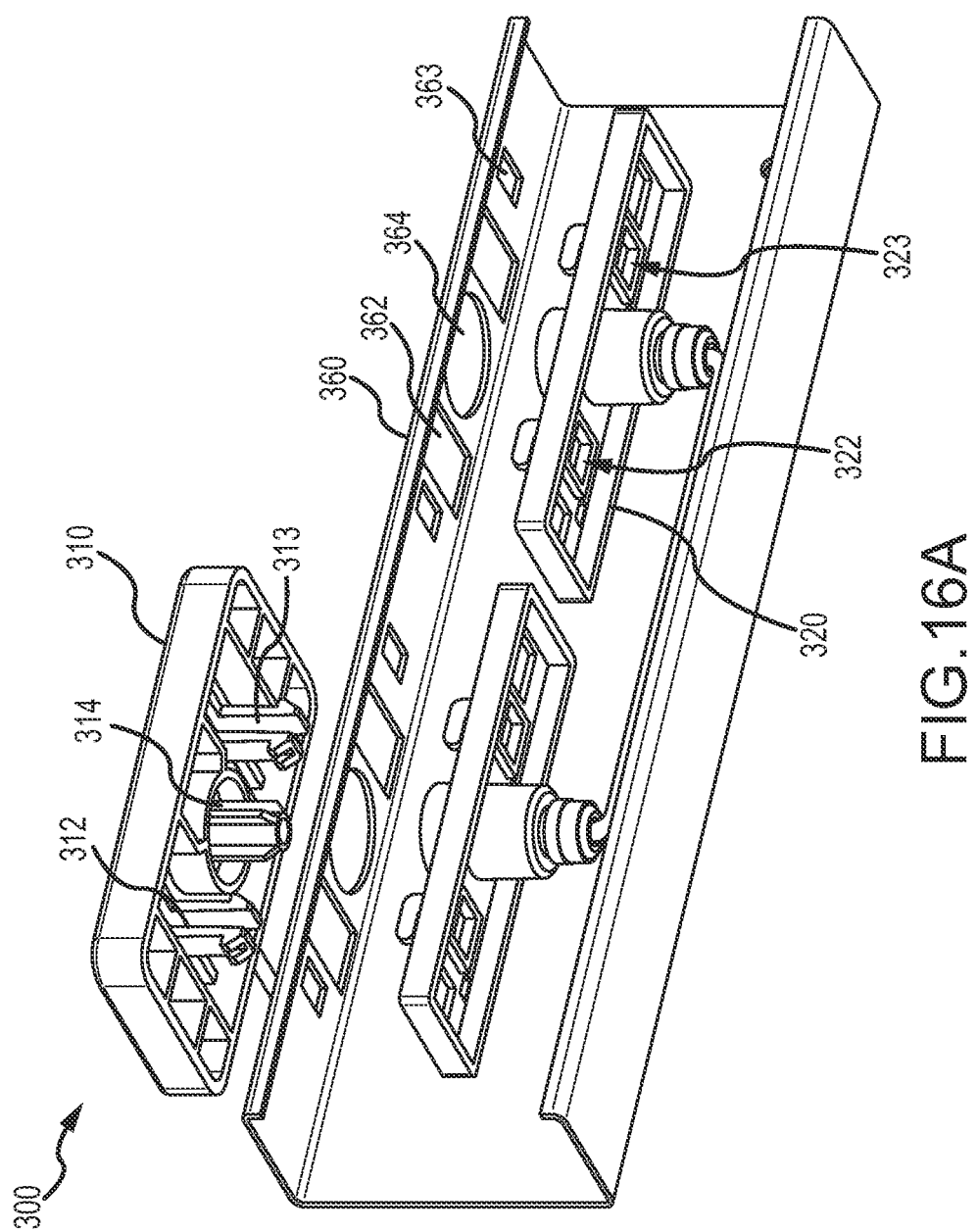

MOUNTING SYSTEM FOR PHOTOVOLTAIC ARRAYS

CROSS REFERENCE TO RELATED APPLICATIONS

This application is a continuation-in-part of co-pending U.S. patent application Ser. No. 13/602,161 filed Sep. 2, 2012, which claims the benefit of priority of U.S. Provisional Application No. 61/530,553 filed Sep. 2, 2011, each of which are incorporated herein by reference in their entireties.

Cross-reference is made to U.S. Provisional Application Nos. 61/530,565 filed Sep. 2, 2011, 62/108,997 filed Jan. 28, 2015, 62/132,426 filed Mar. 12, 2015, and 62/159,070 filed May 8, 2015, and to U.S. patent application Ser. No. 13/602,392 filed Sep. 4, 2012, each of which are incorporated herein by reference in their entireties.

FIELD

Embodiments of the present invention are generally related to photovoltaic (PV) systems, and, in particular, to a rapid-installation mounting system for PV arrays.

BACKGROUND

The improving economics of deploying solar arrays is making it attractive for facility owners and/or operators of assets such as rooftops, reservoirs, landfills and brownfields to deploy commercial-scale photovoltaic (PV) solar panel systems on these assets. In landfill and brownfield applications, deploying solar arrays directly to exposed geomembrane caps (EGC's) provides additional savings due to the elimination of costs associated with installation and maintenance of a two (2) foot vegetative layer required on traditional landfills. Referring to FIG. 1, a conventional grass-topped landfill cover system is shown on the right. The geomembrane cap is indicated at 10. Beneath the geomembrane 10 is waste, an intermediate cover layer and a final grading layer. Grass-topped cover systems require additional layers of drainage media, support soil, top soil, and grass on top of the geomembrane 10. Maintenance of the grass on top is a continuing expense.

On the left of FIG. 1, is an EGC system including a flexible solar panel 12 adhered directly to the surface of the geomembrane 10. The deployment of solar covers such as these require geomembrane materials that can remain exposed to the elements for years and serve as a substrate for adhering flexible photovoltaic panels. In these cover systems, the exposed geomembrane is anchored directly into the landfill and the solar panels are adhered directly to the surface of the membrane. It can be appreciated from the side-by-side figures that the elimination of the grass, top soil and vegetative soil layers will significantly increase the amount of waste that can be accumulated for closing the landfill. Conventional solar arrays using rigid glass-encapsulated panels on metal frames with concrete bases, are less desirable because of the weight of these systems on the landfills. The weight and requisite rigidity of conventional array systems combined with the differential settlement of the underlying waste, causes movement of the arrays which can cause breakage of panels. Over the course of a 20 year deployment, the waste material beneath the cover will settle significantly and cause movement of both the membrane and the photovoltaic panels.

Accordingly, the prior art methods of deploying solar panels on exposed membranes have focused on using flexible panels (See FIGS. 1 and 2) and directly adhering the flexible panels 12 to the surface of the geomembrane 10 using adhesive backing. The flexible geomembrane 10 and flexible panels 12 were thought to be better suited to provide for settling of the waste material over time. Flexibility and movement of the panels is critical to long-term deployment.

Initial attempts at adhering the panels directly to the membrane have had some success. There are several deployed systems that are currently in operation across the country. However, there are also obvious drawbacks to adhering the panels directly to the membrane. A major drawback that has been encountered is maintenance of the panels and geomembranes, and repair or replacement of panels should they be defective or become damaged. While the panels are engineered to withstand the elements, there is still significant risk that the panels will become damaged over a lengthy period of time and will need to be replaced. Even though the panels are flexible, settlement of the waste material results in movement of the membrane and places tremendous stress on the adhered panels causing failures of the adhesive and requiring re-adhering of the panels or panel replacement. In addition, there are known issues with the adhered panels tearing the membranes due to thermal expansion where the adhesive constrains movement of the geomembrane. The coefficient of thermal expansion of the panels is different than that of the membrane. At both high and low temperatures, expansion or contraction of the panels relative to the membrane causes shearing stress on the adhesive layer and can result in failure of the panel, geomembrane and/or adhesive layer.

Another drawback is the inability to redeploy the solar array in the event the facility should require its removal for any reason. This is not possible when the panels are adhered directly to the membrane. For example, certain landfill operators plan and develop their facilities in stages that require shorter term deployment than the economics of a permanent adhesive attachment system can provide. A solar array that can be easily removed and redeployed would allow operators to attach to an EGC on a short term basis, and then remove and redeploy the array at a different location. This is not feasible when the panels are adhered directly to the membrane.

By way of providing additional background, context, and to further satisfy the written description requirements of 35 U.S.C. § 112, the following references are incorporated by reference in their entireties: U.S. Pat. Nos. 4,249,514; 6,672,018; 7,406,800; 8,919,052; 8,316,590; 8,240,109; 8,256,169; 8,418,983; 4,321,745; 61,595,370; US Pat. Publ. Nos.: 2011/0284058; 2011/0072631 2013/0200234, 2015/0153394; 2014/0127935; 2014/0032178; 2014/0025344; 2014/0025220; 2014/0025215; 2014/0020244; 2014/0020230; 2014/0000916; 2013/0262040; 2013/0061198; 2013/0061189; 2013/0061142; 2012/0323635; 2011/0173110; 2011/0137752; 2010/0170163; 2015/0200618; 2014/0326838; 2014/0251431; 2014/0246549; 2014/0223838; 2014/0182662; 2014/0175244; 2014/0174511; 2014/0158184; 2014/0130847; 2014/0102997; 2014/0053891; 2014/0026946; 2013/0183084; 2013/0180574; 2013/0180573; 2013/0180572; 2013/0140416; 2013/0133270; 2012/0298188; 2012/0298186; 2012/0279558; 2012/0260972; 2012/0255598; 2012/0125410; 2008/0234421; 2010/0236183; 2009/0250580; 2011/0047903; 2010/0192505; and 2011/0162779.

SUMMARY

In one embodiment of the invention, a PV array mounting system is disclosed, the system comprising: a plurality of brackets each having a panel connector and a panel connector receiver; and a wire assembly configured to provide electrical communication between a pair of brackets; wherein the panel connector comprises a first, a second, and a center arm each protruding from a lower surface of the panel connector, wherein the panel connector receiver comprises a first arm aperture, a second arm aperture and a center arm aperture each configured to receive, by an interference fit, the respective first, second and center arms of the panel connector; wherein the panel connector is configured to attach to a PV array at an upper surface of the panel connector; wherein the plurality of brackets are configured to interconnect parallel to a longitudinal axis of a structural rack.

In another embodiment, a system for mounting of a PV array is disclosed, the system comprising: a plurality of brackets each having a panel connector and a panel connector receiver; and a wire assembly configured to provide electrical communication between a pair of brackets; wherein the panel connector comprises a first, a second, and a center arm each protruding from a lower surface of the panel connector, wherein the panel connector receiver comprises a first arm aperture, a second arm aperture and a center arm aperture each configured to receive the respective first, second and center arms of the panel connector; wherein the panel connector is configured to attach to a PV array at an upper surface of the panel connector.

In yet another embodiment, a mount system for a photovoltaic panel is disclosed, the mount system comprising: a plurality of brackets each having an upper base portion securable to a plurality of photovoltaic panels at a predetermined spacing, and a lower base portion configured to engage the upper base portion; a mounting rail having a central spine and a plurality of openings at a predetermined spacing matching the spacing of the brackets, the mounting rail being secured to the plurality of brackets and the mounting rail being disposed between the upper base portion and the lower base portion; and an attachment rail secured to the mounting rail, the upper base portion and the lower base portion including interfitting locking formations which are removably received and secured together whereby the plurality of photovoltaic panels are removably secured to the mounting rail, wherein the bracket comprise elastomeric materials and polymeric materials.

In another embodiment, the present invention provides a unique and novel, low-cost mounting system which will allow for ease of installation, flexibility of movement, and the ability to remove and redeploy the system as needed. The mount system in accordance with the teachings of the present invention generally comprises a plurality of standoff mounts which are secured to a substrate (geomembrane) in a parallel grid system, elongated mounting rails (female tracks) which are secured onto the standoff mounts in parallel, and attachment rails (male track inserts) which are either secured to opposing side edges of the PV panel, incorporated into the PV panels or incorporated into a supporting carrier for the PV panel. The male track inserts are slidably received into mounting channels on opposing side edges of the female tracks to suspend the solar panels between the tracks and above the substrate (geomembrane). The shapes of the mounting rails and attachment rails can vary extensively and are determined by the requirements of the specific array.

The standoff mounts include a base portion, and a neck portion extending upwardly from the base portion and a fastener received in the neck portion.

The standoff mounts can be secured to the membrane using a plurality of different attachment methods including, but not limited to adhesive bonding, ultrasonic welding, or annular bonding rings.

The base portions of the standoff mounts can also be bonded to a tape carrier with a predetermined spacing so that the standoff mounts can be quickly and easily installed in parallel strips onto the membrane. The tape carrier material is preferably the same as or similar to the membrane so that the tape carrier can be easily bonded to the membrane. Alternatively, a bonding tape can be provided with a plurality of holes formed at predetermined spacing.

The standoff mounts can also be bonded to a more rigid carrier strapping which can be used in other mounting configurations where the strapping can be secured to an underlying surface, such as a building roof or a vehicle roof with fasteners.

The mounting rail (female track) includes an elongated spine having a plurality of holes and/or elongated slots spaced longitudinally along the centerline. In use, the standoff mounts are spaced to match the spacing of the holes/slots in the track. When installed, the holes/slots align with the standoff mounts and fasteners are inserted through the holes/slots into the top of the neck portion. The elongated slots provide for sliding movement of the mounting rail relative to the standoff mounts. In the preferred embodiment, the opposing side edges of the attachment rail are provided with symmetrically opposed mounting channels that receive the complementary attachment rails (male track inserts). The attachment rails having an inner land portion onto which the side edge portion of the PV panel is seated. The PV panels are secured to the track inserts with rivets or other fasteners or bonded with an adhesive. The attachment rails further have an outer retaining tab which is received into the mounting channel in the mounting rail. The attachment rails and mounting rails include interfitting retaining formations to ensure that the attachment rails remains captured within the mounting channels in the mounting rails.

In an alternative embodiment, the mount system comprises a plurality of elongated mounting rails (female rails) which are secured to a substrate (i.e. geomembrane) in a parallel grid system, and attachment rails (male track inserts) secured to opposing side edges of the PV panels. In this exemplary embodiment, the attachment rails (male track inserts) are slidably received into mounting channels in opposing side edges of the parallel mounting rails (female tracks) to suspend the solar panels between the mounting rails and above the substrate. The PV panels are attached to the attachment rails by rivets, or other fasteners, or bonded with an adhesive.

In another embodiment, elongated female mounting rails are attached to a substrate with large-based rivets, and are not attached to a standoff mount. The large-based rivets are removably attached to the base of the elongated mounting rails by snapping the conical head of the rivet through a hole in the substrate and into base of the elongated rails. The elongated mounting rails are arranged in parallel relationship to each other in predetermined spacings. The predetermined spacings are determined by the widths of the PV panels such that the male attachment rails can be fastened to the opposing edges of the PV panels. The male attachment rails are removably inserted into the female receiving portion of the elongated female mounting rails in such a way that the distance between the parallel rails is spanned.

According to another embodiment of the invention, a plurality of elongated mounting rails (female rails) are secured to a substrate (i.e. geomembrane) in a parallel grid system at a location remote from the solar installation site. In this embodiment, the substrate is not the substrate 10 in FIG. 1. Large-based rivets can also be bonded to a tape carrier with a predetermined spacing so that standoff mounts can be quickly and easily installed in parallel strips onto the membrane.

In another alternative embodiment, the mount system in accordance with the teachings of the present invention further comprises a plurality of elongated mounting rails which are secured to a substrate (i.e. geomembrane) in a parallel grid system, and attachment rails secured to opposing side edges of the PV panels. In this exemplary embodiment, the attachment rails (male track inserts) are slidably received into the female receiving portion in opposing side edges of the parallel mounting rails (female tracks) to suspend the solar panels between the mounting rails and above the substrate. The elongated mounting rails are attached to the substrate with large based rivets, and are not attached to a standoff mount.

In another embodiment of the invention, a horizontal elevated male rail is received into the female tracks of the elongated mounting rails. The elongated mounting rails and horizontal elevated male rails have interfitting locking formation to ensure that the horizontal elevated male rail remains captured within the female receiving portion of the elongated mounting rail.

In an embodiment of the invention, the elongated mounting rails have rail tray edges some distance below the female receiving portion of the elongated female mounting rails, which travel the distance of the elongated mounting rails parallel to the female receiving track. The rail tray edges are concave and face up, away from the mounting surface.

In another alternative embodiment, the mount system in accordance with the teachings of the present invention further comprises a plurality of elongated vertical mounting rails with a female receiving channel located on top of the rail. The receiving channel travels the length of the vertical mounting rail and provides a female receiving channel. On either side of the receiving channel is a locking formation (notch) which travels the distance of the vertical rail parallel to the receiving channel. Some distance below the locking formations are rail tray edges which travel the distance of the vertical rail parallel to both the receiving channel and locking formations. The rail tray edges are concave and face up, away from the mounting surface.

In another embodiment, the mount system further comprises a plurality of ballast trays with a rectilinear shape having ballast tray edges that are concave and face down toward the mounting surface. The ballast tray edges are removably set in the rail tray edges and secure the elongated vertical female rails to the mounting surface. The combination of the ballast trays with the elongated female rails provides an alternative method of securing the mount system to the substrate, as compared to using the large-based rivets. The use of the ballast trays to secure the system eliminates the necessity of penetrating the substrate. The use of the ballast trays to secure the system also permits the mounting system to be located on uneven, and even shifting surfaces, such as landfills and/or brownfield sites.

In another embodiment, the mount system further comprises a plurality of ballast trays with a rectilinear shape having ballast tray edges that are concave and face down toward the mounting surface. The ballast tray edge travels the top outer edges of the ballast trays. The ballast tray edges are removably set in the rail tray edges and secure the elongated mounting rails to the mounting surface. The combination of the ballast trays with the elongated mounting rails provides an alternative method of securing the mount system to the substrate, as compared to using the large-based rivets. The use of the ballast trays to secure the system eliminates the necessity of penetrating the substrate. The use of the ballast trays to secure the system also permits the mounting system to be located on uneven, and even shifting surfaces, such as landfills, and/or brownfield's.

In yet another embodiment, the rail tray edges receive a ballast tray edge. The ballast tray edge travels the top outer edges of the ballast trays. The ballast trays receive ballast that can be in the form of bricks, rocks, dirt, gravel, or any other medium that might be placed in the ballast tray to hold the ballast tray against the surface of the ground, membrane, roof, or any other surface upon which the mount system is placed.

In yet another embodiment of the invention, the mount system is made from a polymeric material, or a metal, or a triglass pulltrusion.

In another embodiment of the invention, elongated vertical mounting rails receive a vertical elevator into the female receiving channel of the elongated vertical mounting rail. On the bottom of the vertical elevator is a male vertical portion that is received into the female receiving channel of the elongated vertical mounting rail, and inward facing vertical locking portions (hooks) on opposite sides of the vertical elevator that are removably snapped into the notches of the locking formations on the same elongated vertical mounting rail. Both the male vertical portion and the vertical locking portions travel the length of the elongated vertical elevator. On top of the vertical elevator, opposite of the male vertical portion, is female receiving channel. The female receiving channel runs the length of the vertical elevator and provides a female receiving channel. On either side of the female receiving channel is a locking formation (notch) which travels the distance of the vertical elevator parallel to the receiving channel.

In yet another embodiment, vertical elevators receive vertical male rails into the female receiving channel of the vertical elevator. On the bottom of the vertical male rail is a male vertical portion that is received into the female receiving channel of the vertical elevator, and inward facing vertical locking portions (hooks) on opposite sides of the vertical male rails that are removably snapped into the notches of the locking formations on the elongated vertical elevator. The top of the vertical male rail comprises an elongated strip having an inner land portion onto which the side edge portion of the PV panel seats. At one edge of the inner land portion is a raised shoulder which facilitates alignment of the panel and the vertical male rail.

In yet another embodiment, the present invention provides a mount system for a photovoltaic panel which will allow for ease of installation, flexibility of movement, and the ability to remove and redeploy the system as needed. The mount system in accordance with the teachings of the present invention generally comprises a plurality of standoff mounts each having a base portion securable to a substrate in a linear array at a predetermined spacing, and the plurality of standoff mounts further have a neck portion extending upwardly from the base portion.

The system further includes a mounting rail having a central spine including at least one side edge and a plurality of openings arranged longitudinally along the central spine at a predetermined spacing matching the spacing of the one-piece standoff mounts. The mounting rail is supported on the neck portions of the one-piece standoff mounts above the substrate, and the mounting rail is secured to the plurality of one-piece standoff mounts. An attachment rail has an inner land portion on which an edge portion of a PV panel is secured, and further has an outer retaining tab portion.

The system further comprises a polymeric wind shield having a retaining tab ion and a shield portion extending outwardly and downwardly from the retaining tab portion. At least one side edge of the central spine of the mounting rail and the outer retaining tab portion of the attachment rail include interfitting locking formations which are removably received and secured together whereby the PV panel is removably secured to the mounting rail.

The one-piece standoff mounts comprise elastomeric materials, and at least one of the mounting rails and the attachment rails comprise polymeric materials. The mounting rails comprise a female track having opposed outwardly facing mounting channels on opposing sides of the central spine. The mounting rail may include a polymeric wire management channel. The female track may include a polymeric J-shaped wire management channel extending downwardly from an underside of one of the opposed mounting channels. The fasteners may be a threaded bolt and cap nut, the cap nut being received in the one-piece standoff mount and the threaded bolt being received through the opening in the mounting rail and into the cap nut in the one-piece standoff mount.

The substrate is an elastomeric membrane, and the mount system further comprises a plurality of annular bonding rings formed from an elastomeric membrane material and having a diameter greater than a diameter of the base portion of the one-piece standoff mounts. The elastomeric membrane annular bonding rings have a central opening which is received over the neck portion of the one-piece standoff mount, and the elastomeric membrane annular bonding rings are bonded to the elastomeric membrane to secure the one-piece standoff mounts to the elastomeric membrane.

The attachment rail comprises a male track insert having an outer retaining tab portion which is received into one of the opposed mounting channels in the female track whereby the PV panel is secured to the female track. The elastomeric membrane is a geomembrane.

In yet another embodiment, the present invention provides a mount system for a photovoltaic panel which will allow for ease of installation, flexibility of movement, and the ability to remove and redeploy the system as needed. The mount system in accordance with the teachings of the present invention generally comprises a plurality of standoff brackets secured to standoffs, or some other mount secured to a substrate, and/or a roof, in a parallel grid system, elongated rails (male tracks)

The mounting system further comprises wind shields which are utilized on the outer edges of a panel array. The wind shields have a retaining tab portion which is received into the mounting channel in the mounting rail and a shield portion which extends outwardly and downwardly to redirect air flow up and over the PV panels.

The mounting system may still further comprises a separate wire management mounting rail which includes the opposed mounting channels and further includes a J-shaped wire management channel extending downwardly from one side of the rail. Wiring is received within the hook portion of the channel.

Accordingly, among the objects of the instant invention is the provision of a PV panel mounting system that is inexpensive.

Another object of the invention is to provide a PV panel mounting system that is easy to install.

Yet another object of the invention is to provide a mounting system that will allow the PV panels to be easily reconfigured, removed or replaced when needed.

Still another object of the invention is to provide a mounting system that will allow relative movement of the PV panels and the membrane thus reducing the likelihood of damage to both the PV panels and the membrane.

Other objects, features and advantages of the invention shall become apparent as the description thereof proceeds when considered in connection with the accompanying illustrative drawings.

BRIEF DESCRIPTION OF THE DRAWINGS

The accompanying drawings, which are incorporated in and constitute a part of the specification, illustrate embodiments of the invention and together with the general description of the invention given above, and the detailed description of the drawings given below, serve to explain the principals of this invention.

FIG. 8 is a cross-sectional end view of a female mounting rail and a wind shield;

FIG. 9 is a cross-sectional view of the mounting system including the wind shield attached to a geomembrane;

FIG. 11A is a perspective view of a plurality of standoff mounts attached to a carrier tape;

FIG. 11B is a perspective view of a plurality of standoff mounts attached to a carrier strapping;

FIG. 11C is a perspective view of an attachment system including plurality of standoff mounts and a bonding tape including a plurality of spaced openings;

FIG. 16A is an exploded lower perspective view of a mounting system according to another embodiment of the invention.

Figure 1:
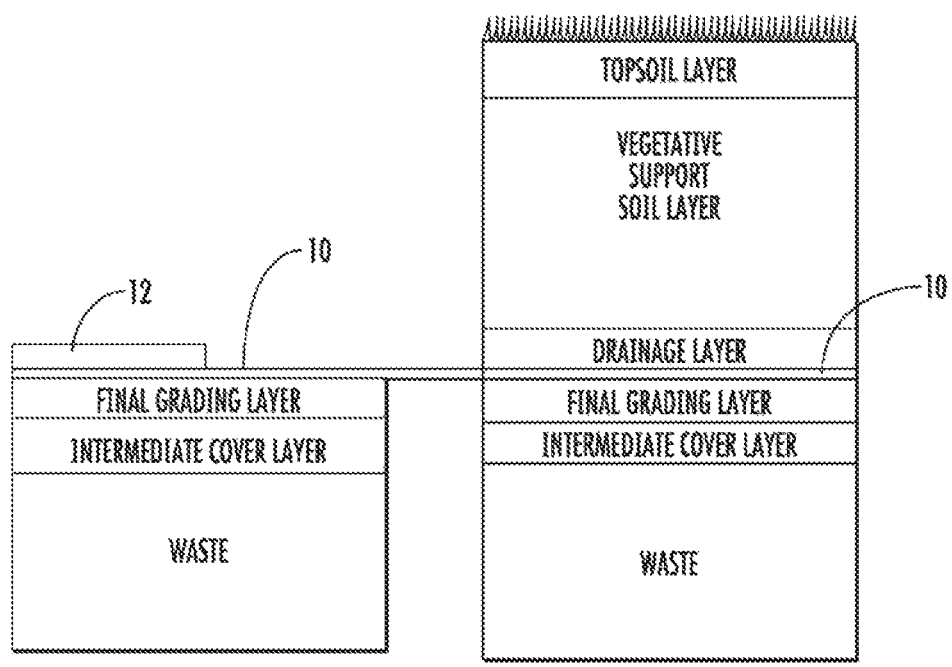
FIG. 1 is an illustration of two prior art landfill cover systems.
Figure 2:
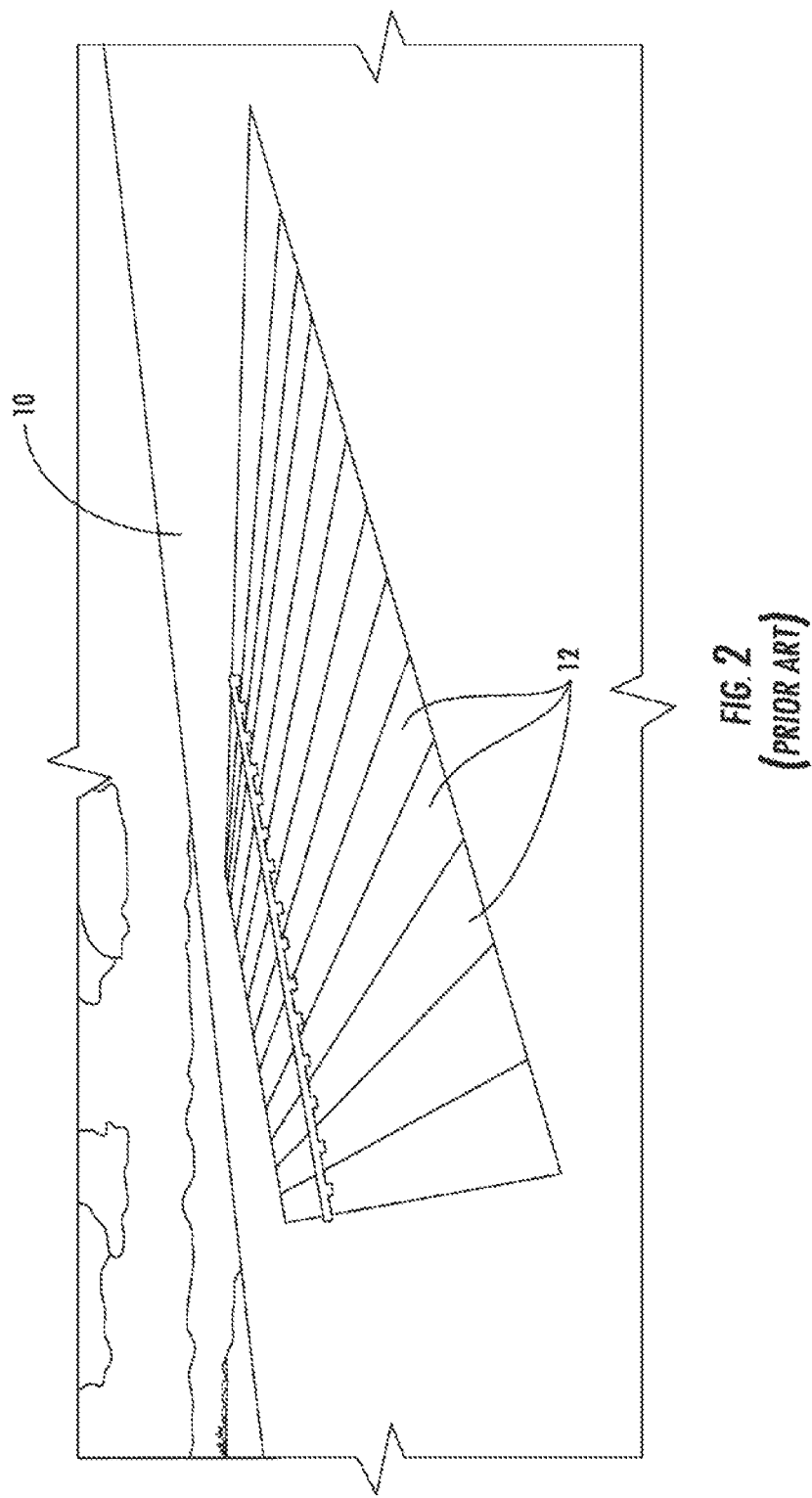
FIG. 2 is an image of a prior art exposed geomembrane cover system having flexible laminate solar panels adhered directly to the surface of the membrane.
Figure 3:
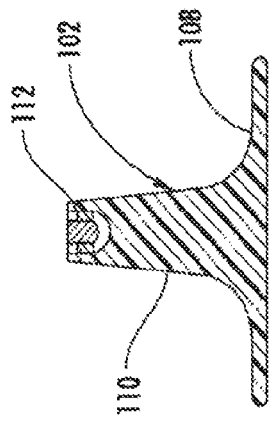
FIG. 3 is a perspective view of a standoff mount constructed in accordance with the teachings of the present invention.
Figure 5:
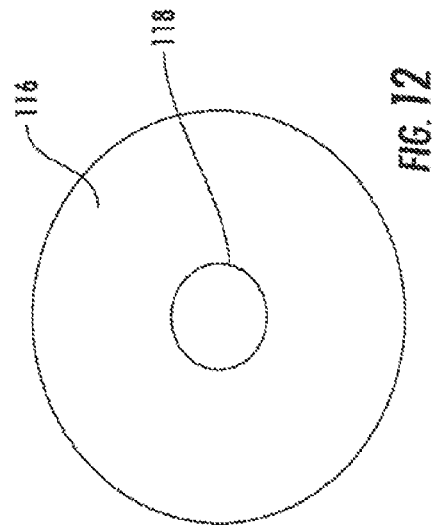
FIG. 5 is a cross-sectional view thereof taken along line 5-5 of FIG. 4.
Figure 4:
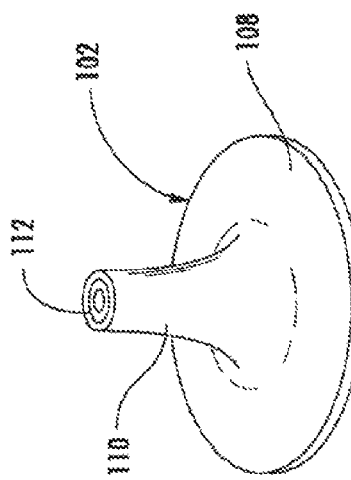
FIG. 4 is a top view thereof.

It should be understood that the drawings are not necessarily to scale (those that are to scale are so noted.) In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

FIGS. 1-16 depict several views of embodiments of the invention. The present invention provides a unique and novel, low-cost PV array mount system which will allow for ease of installation, flexibility of movement, and the ability to remove and redeploy the system as needed.

Before proceeding with the description, it is to be understood that the mount system herein is capable of being used with all types of photovoltaic (PV) panels 100, including flexible PV panels, as well as rigid PV panels, regardless of the length or width of the panels. The system has the flexibility to be deployed in virtually any configuration. It is also noted that the electrical systems that accompany the PV panels 100 are generally well known in the art, and will not be described in detail herein, albeit there will be mention of the mount system accommodating the required wiring of the panels.

Referring to FIGS. 3-12, the mount system in accordance with the teachings of the present invention generally comprises a plurality of standoff mounts 102 (FIGS. 3-5) which are secured to a substrate 10 (i.e. geomembrane) in a parallel grid system, elongated mounting rails 104 (FIG. 6) which are secured to the standoff mounts 102 in parallel, and attachment rails 106 secured to opposing side edges of the PV panels 100. The terms mounting rails and attachment rails are intended to define the relative placement of the rails in the system and it should be understood that these rails could be male or female depending on the application. While the exemplary embodiment illustrated herein is a female track and a male track insert, the disclosure should not be limited to only that arrangement. The shapes of the mounting rails and attachment rails can vary extensively and are determined by the requirements of the specific array. In the exemplary embodiment, the attachment rails (male track inserts) 106 are slidably received into mounting channels in opposing side edges of the parallel mounting rails (female tracks) 104 to suspend the solar panels 100 between the mounting rails 104 and above the substrate 10 (See FIG. 7).

For purposes of illustration and description, the preferred embodiments herein will be described in connection with mounting to an elastomeric membrane 10, such as a geomembrane, covering a brownfield or landfill. However, it should be appreciated that the mount system can also be deployed on other membrane covered substrates, such as the roofs of buildings or vehicles. In addition, other mounting options will be described for non-membrane covered substrates.

Referring back to FIGS. 3-5, the standoff mounts 102 include a base portion 108, a neck portion 110 extending upwardly from the base portion 108 and a fastener 112/114 received in the neck portion. In the exemplary embodiment as illustrated, a threaded cap nut 112 is inserted or molded into the top of the neck portion 110 for receiving a threaded fastener 114. Alternatively, the threaded fastener 114 could be inserted or molded into the top of the neck portion 110 and the cap nut 112 received onto the fastener. In addition, a variety of additional types of fasteners 112/114 are also possible within the scope of the disclosure. Even further still, it is contemplated that fastener elements may be directly incorporated into the mounting rails 104 for direct attachment of the mounting rails 104 to the standoff mounts 102.

The standoff mounts 102 can be manufactured in a variety of shapes as dictated by the attachment application and can be made from rigid or elastomeric materials, also as dictated by the attachment application. Where an elastomeric material is used for the standoff mounts 102 it allows the neck portions 110 thereof to flex under stress and provides a fair amount of flexibility of movement while maintaining a consistent grid array. The preferred shape as illustrated is a cone with a large bottom surface to provide structural stability and provide a securing platform.

Figure 12:
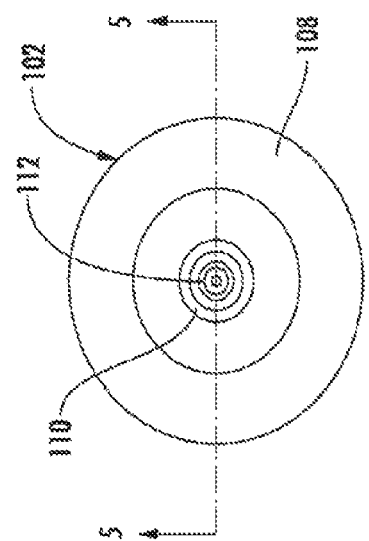
FIG. 12 is a top view of an annular bonding ring in accordance with the invention.
Figure 7:
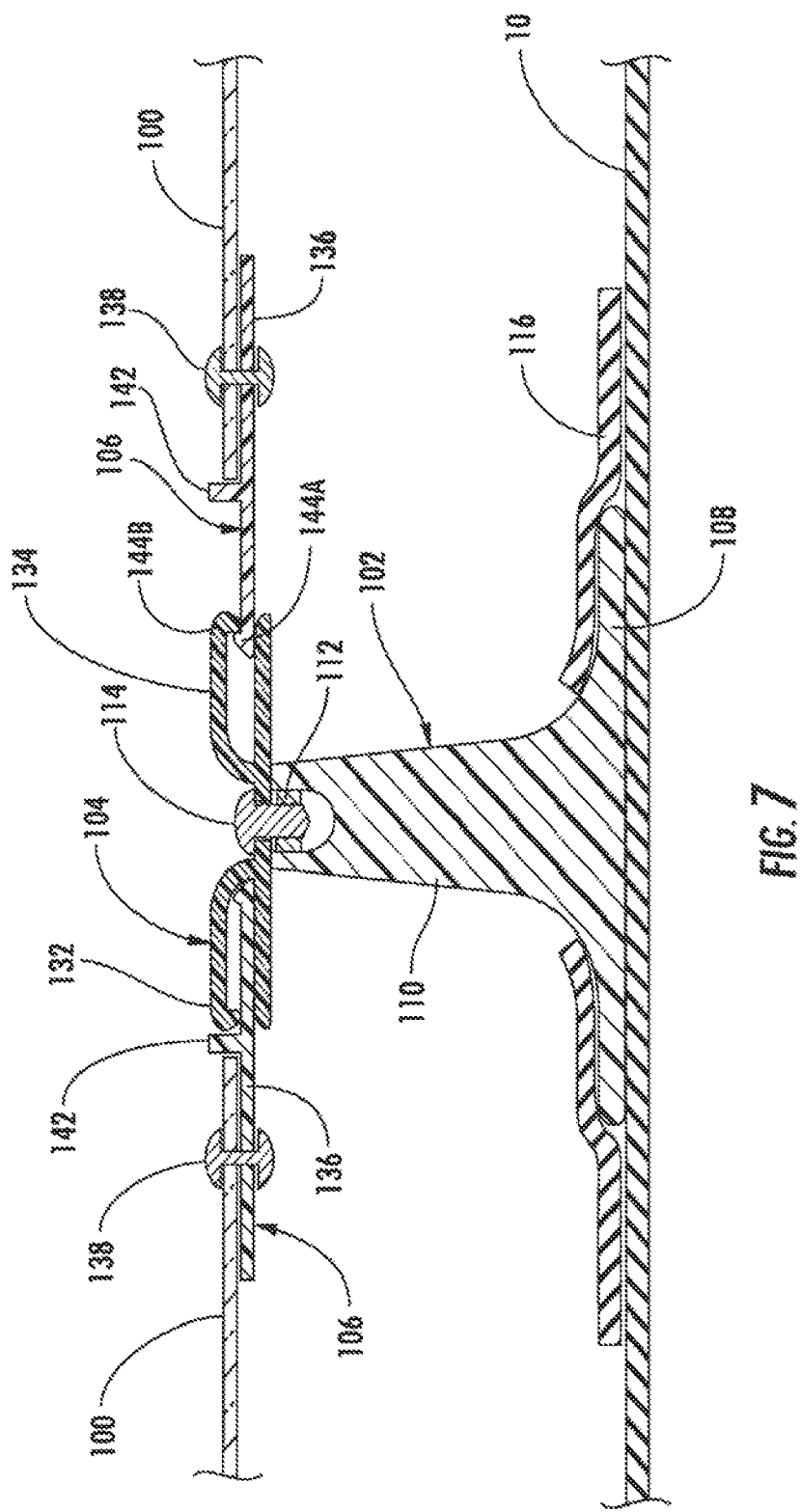
FIG. 7 is a cross-sectional view of the complete mounting system attached to a geomembrane.

Referring to FIGS. 7 and 12, the standoff mounts 102 can be secured to the membrane using a plurality of different attachment methods including, but not limited to adhesive bonding, ultrasonic welding, or annular bonding rings. In the exemplary embodiment as illustrated, the standoff mounts 102 are secured to the membrane 10 using an annular bonding ring 116 having a central opening 118. The bonding ring 116 has a diameter greater than the base portion 108 and is made of a material that is the same as or similar to the membrane material so that the bonding ring 116 can be bonded to the membrane 10. For example, the bonding ring material could comprise an engineered membrane of TPO, PP, PE, EPDM or other suitable materials that are capable of being bonded to the underlying membrane.

In use, the bonding ring 116 is received over the neck portion 110 of the standoff mount 102 and is bonded to the membrane 100 using conventional membrane bonding materials or methods, thereby trapping the base portion 108 and holding it in place (see FIG. 7).

Referring to FIG. 11A, the base portions 108 of the standoff mounts 102 can also be bonded to a tape carrier 120 with a predetermined spacing so that the standoff mounts 102 can be quickly and easily installed in parallel strips onto the membrane 10. The tape carrier 120 is preferably made from the same material or similar material to the membrane 10 so that the tape carrier 120 can be easily bonded to the membrane 10. Alternatively, a tape strip 122 can be provided with a plurality of holes formed at predetermined spacing (See FIG. 11C) wherein the standoff mounts 102 are inserted through the holes and the base portions 108 thereof held beneath the tape strip 122. The tape strip 122 is also preferably made from the same material or similar material to the membrane 10 so that the tape strip 122 can be easily bonded to the membrane 10.

Still further, the standoff mounts 102 can also be bonded to a more rigid carrier strapping 124 (FIG. 11B) which can be used in other mounting configurations where the strapping 124 can be secured to any rigid underlying substrate, such as a building roof, concrete slab, or a vehicle roof with fasteners (not shown)

Figure 6:
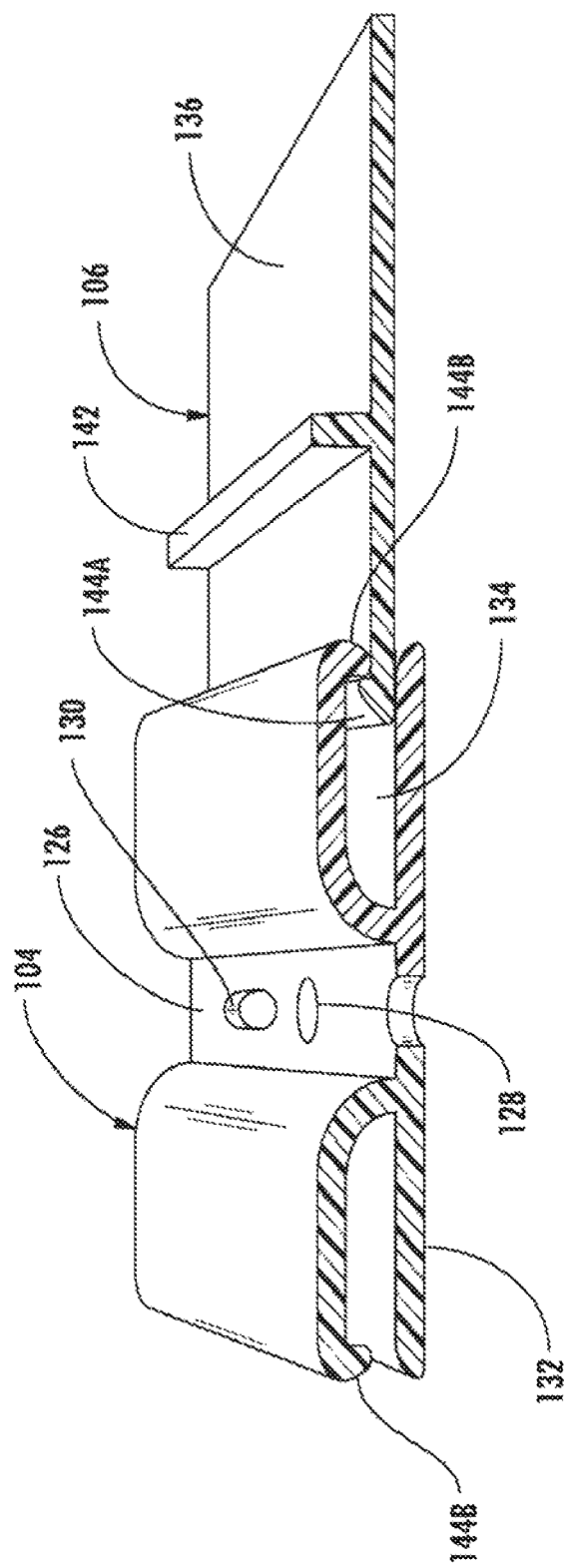
FIG. 6 is a cross-sectional end view of a female mounting rail and male attachment rail constructed in accordance with the teachings of the present invention.

Referring now to FIGS. 6 and 7, the mounting rail 104 includes an elongated spine 126 having a plurality of holes 128 and/or elongated slots 130 paced longitudinally along the centerline. In use, the standoff mounts 102 are spaced to match the spacing of the holes/slots in the mounting rail 104. When installed, the holes/slots align with the standoff mounts 102 and fasteners 114 (FIG. 7) are inserted through the holes/slots into the cap nuts 112 in the tops of the neck portions 110. The elongated slots 130 provide for longitudinal sliding movement of the tracks 104 relative to the standoff mounts 102. In another alternative (not shown) it is contemplated that the insert of the standoff mount 102 may include a swivel arm (not shown) that would rotate relative to the neck portion 110 to provide further range of motion if needed. At least one side of the mounting rail 104 is provided with a mounting channel for receiving the attachment rail 106. In the exemplary embodiment, the opposing side edges of the mounting rail 104 are provided with symmetrically opposed mounting channels 132, 134 that receive the complementary attachment rails 106.

The attachment rail 106 generally comprises an elongated strip having an inner land portion 136 onto which the side edge portion of the PV panel 100 is seated. The PV panels 100 are secured to the land portions 136 of the attachment rails 106 with rivets 138 or other fasteners or bonded with an adhesive. Alternatively, the attachment rails 106 can be integrated into the construction of the PV panels, or can be integrated into a support carrier (not shown) for the PV panel 100. The attachment rails 106 further include an outer retaining tab portion 140 which is received into the mounting channel 132,134 in the mounting rail 104. Separating the land portion 136 from the tab portion 140 is a raised shoulder 142 which facilitates alignment of the attachment rail 106 with the panel 100 and the mounting rail 104. The attachment rail 106 and mounting channels 132, 134 include interfitting locking formations (hooks) 144A,144B to ensure that the attachment rail 106 remains captured within the mounting channels 132,134.

The mounting rail 104 and attachment rail 106 are made from polymeric materials, triglass, metal or both and include a low friction covering or additive allowing for free movement of the attachment rail 106 relative to the mounting rail 104. The depth of the channel 132,134 is variable depending on the desired ability of the attachment rail 106 to slide freely inward and outward from the centerline of the mounting rail 104. The attachment rail 106 is also able to slide longitudinally along the length of the channel 132,134. The height of the channel 132,134 is also variable and should be loose enough to allow for movement but also tight enough to ensure that the attachment rail 106 remains captured within the channel 132,134. The top wall of the channel 132,134 should be thin enough to allow the attachment rail 106 to be snapped into place (some degree of flex) but thick enough to prevent breaking during installation. It is also noted that the shape of the retaining "tooth" or "hook" 144 should not be limited by the attached illustrations. Other shapes and configurations of interfitting parts are also within the scope of the invention. Even further still, it is contemplated that the retaining "hook" 144 may be machined directly into the side edge of the PV panel eliminating the need for the attachment rail 106 altogether.

Turning to FIG. 7, an end view of the system is shown as it may be typically deployed on a landfill geomembrane 10. The standoff mounts 102 are spaced as required and secured to the geomembrane 10 with bonding rings 116. Thereafter, the mounting rails 104 are secured to the standoff mounts 102 in parallel. The holes/slots in the mounting rails 104 are aligned with the standoff mounts 102 and the fasteners 114 are inserted through the holes/slots and secured to the standoff mounts 102. As seen in FIG. 7, the mounting rails 104 are elevated above the membrane 10. The attachment rails 106 are attached to the PV panels 100 in the factory or at a staging site. The PV panels 100 are then snapped into the mounting channels 132,134 of the parallel rails 104 to hold the PV panels 100 in position. Elevating the PV array above the membrane 10 separates movement of membrane 10, due to whatever reason, i.e. expansion, contraction shifting, from the array. The standoff mounts 102 buffer any resulting movement. Elevating the PV array also allows air to flow freely beneath the array serving to keep the panels 100 and the underlying membrane 10 cooler.

To reduce wind stresses on the system, an L-shaped wind shield 146 (See FIGS. 8 and 9) is provided and assembled with the outermost mounting rail 104 of the array. In the exemplary embodiment, the wind shields 146 having a retaining tab portion 148 which is received into the outer mounting channel 134 in the mounting rail 104 and a shield portion 150 which extends outwardly and downwardly to redirect air flow 152 up and over the array. The wind shield 146 could also be molded directly into an alternate design of the track (not shown) that would only be used as an outside edge.

Wiring (not shown) between adjacent panels 100 and wiring to a control system (not shown) can be fed beneath the elevated panels 100 or can be secured in conduits (now shown) that snap together with the mounting rails 104.

Figure 10:
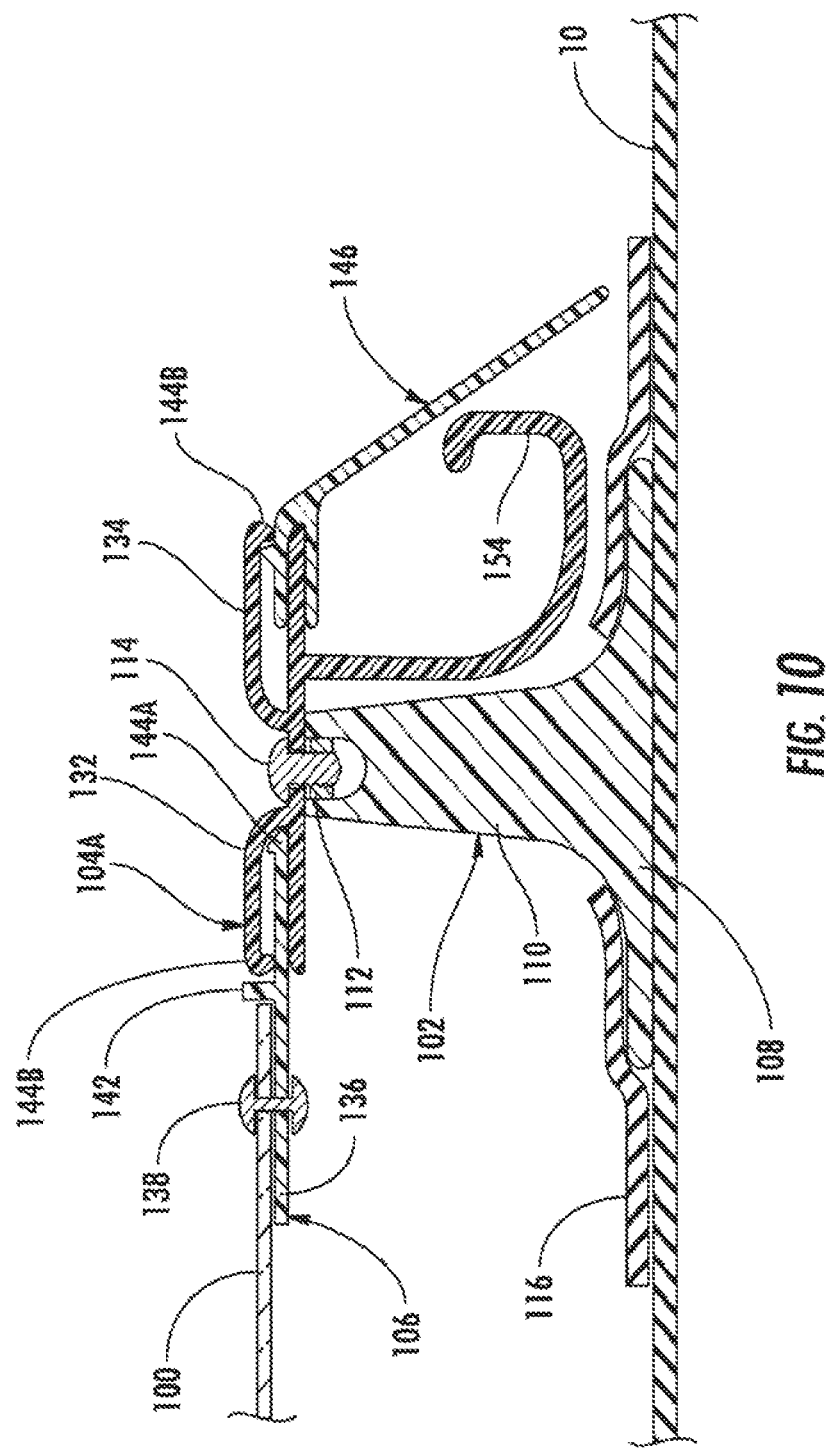
FIG. 10 is a is a cross-sectional view of the mounting system including the wire management rail and a wind shield attached to a geomembrane.
Figure 13A:
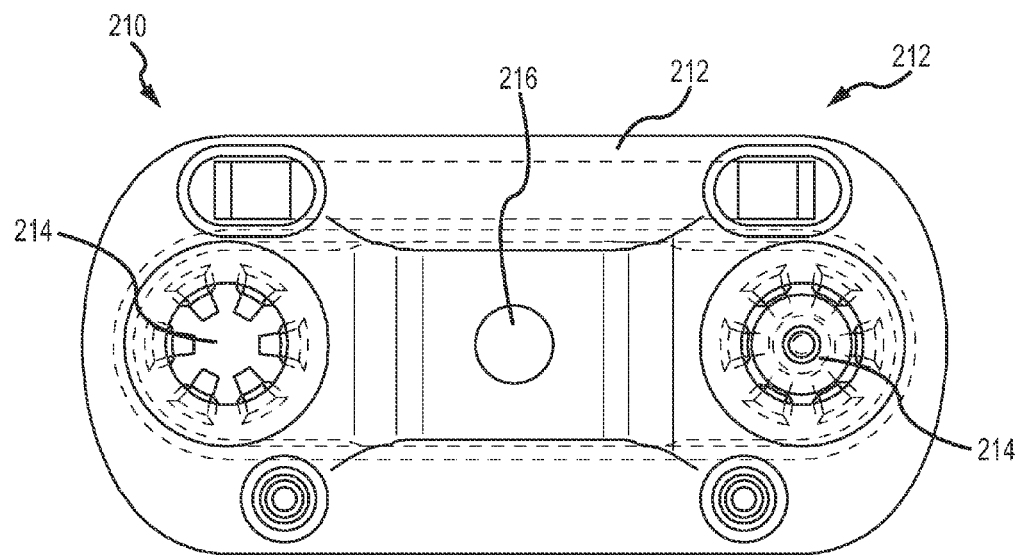
FIG. 13A is a top view of a mounting bracket, according to another embodiment of the invention (this figure is to scale)
Figure 13B:
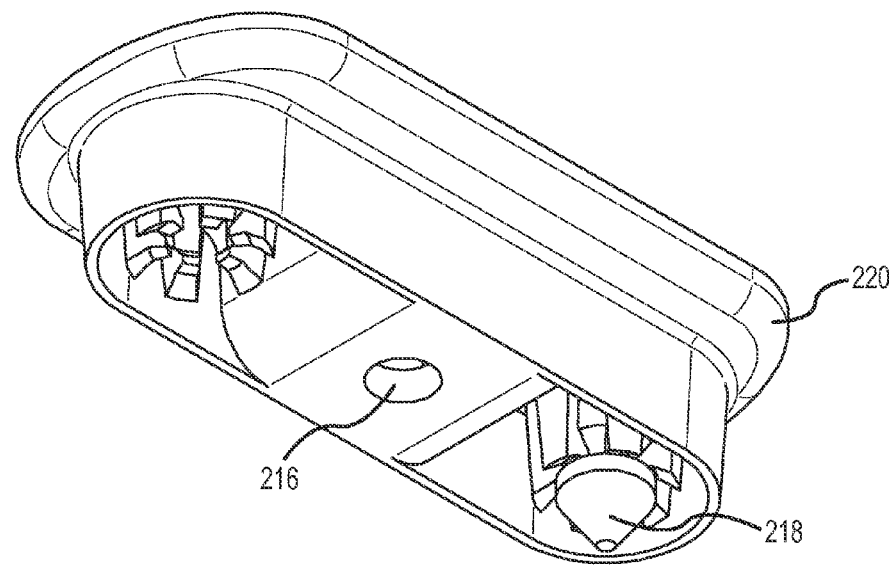
FIG. 13B is a lower perspective view of the mounting bracket of FIG. 13A (this figure is to scale)
Figure 13C:
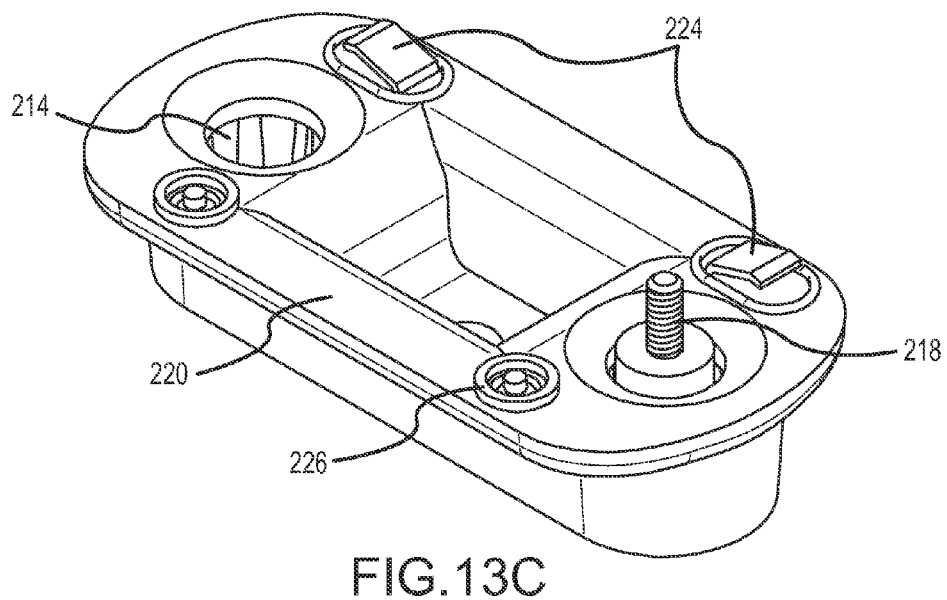
FIG. 13C is a top perspective view of the mounting bracket of FIG. 13A (this figure is to scale)
Figure 13D:
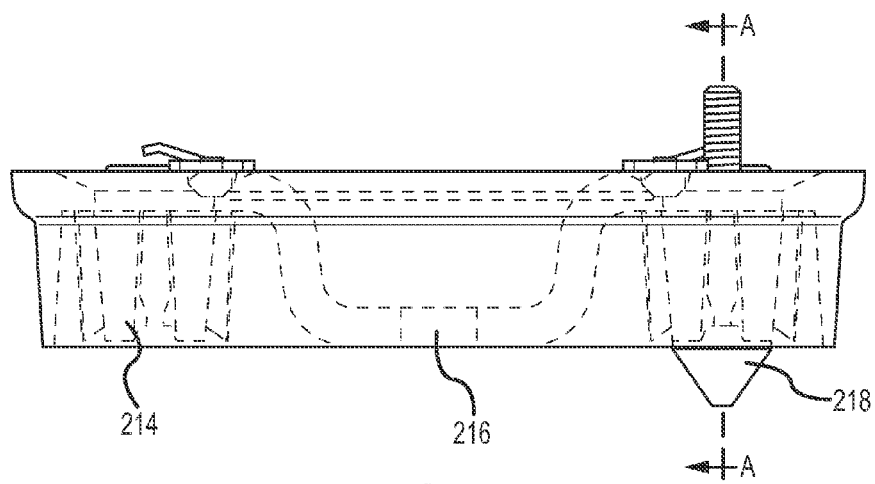
FIG. 13D is a cross-sectional left side elevation view of the mounting bracket of FIG. 13A (this figure is to scale)
Figure 13E:
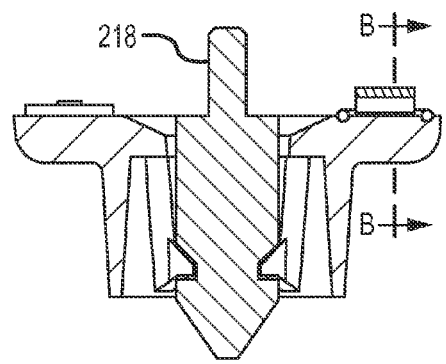
FIG. 13E is a cross-sectional view of Section A-A of FIG. 13D (this figure is to scale 1:2)
Figure 13H:
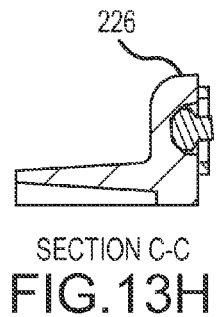
FIG. 13H is a cross-sectional view of Section C-C of FIG. 13G (this figure is to scale 1:2)
Figure 13F:
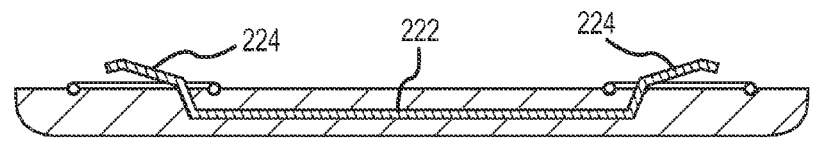
FIG. 13F is a cross-sectional view of Section B-B of FIG. 13E (this figure is to scale 1:2)
Figure 13G:
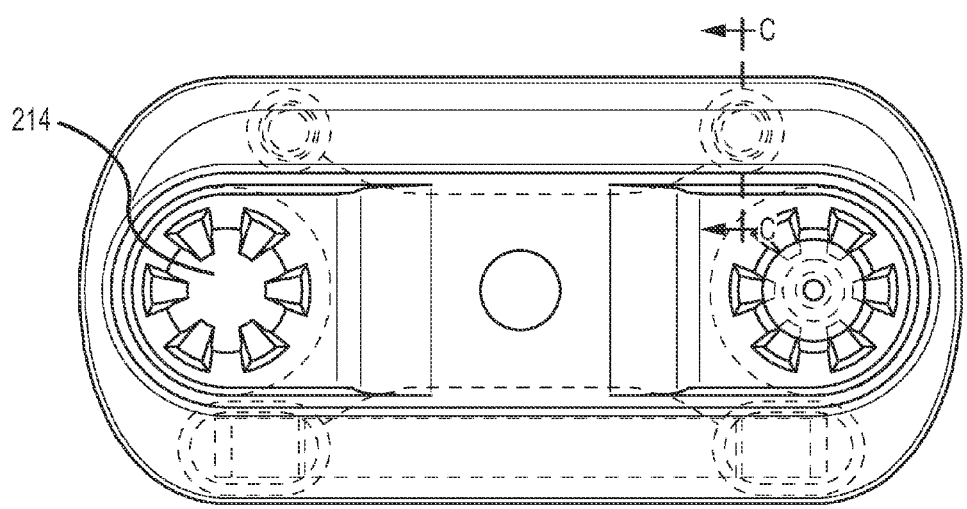
FIG. 13G is a bottom view of the mounting bracket of FIG. 13A (this figure is to scale)

As illustrated in FIG. 10, the mount system may still further include a separate wire management rail 104A which includes the opposed mounting channels 132,134 and further includes a J-shaped wire management channel 154 extending downwardly from one side of the mounting rail 104. Wiring may be received within the hook portion of the J-shaped channel 154.

It is noted that the illustrated embodiments represent only two adjacent rows of panels 100 and tracks 104, but it is to be understood that the system can be expanded to implement an indefinite number of rows within the space of the membrane 10 or other substrate.

Figure 14:
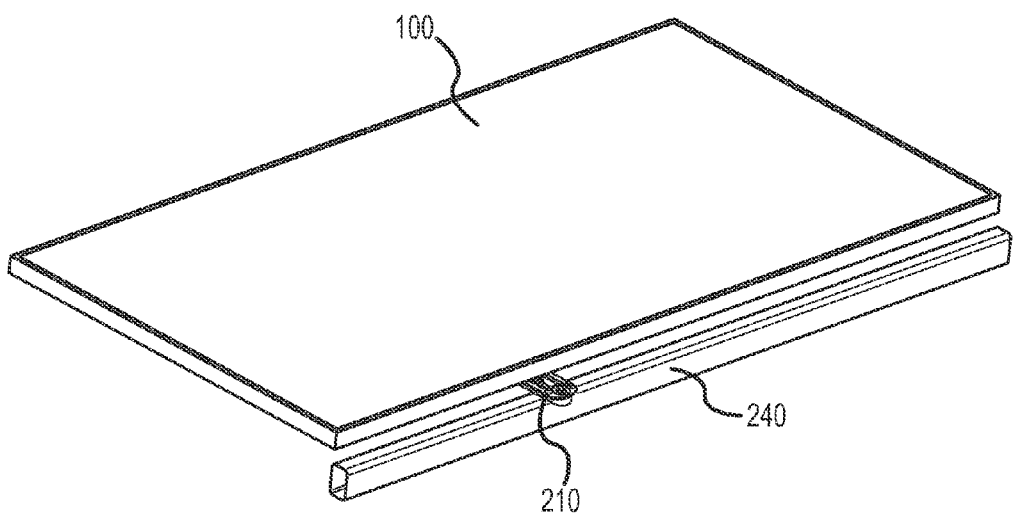
FIG. 14 is an upper perspective view of the mounting system of FIG. 13 as engaged with a PV array.
Figure 15:
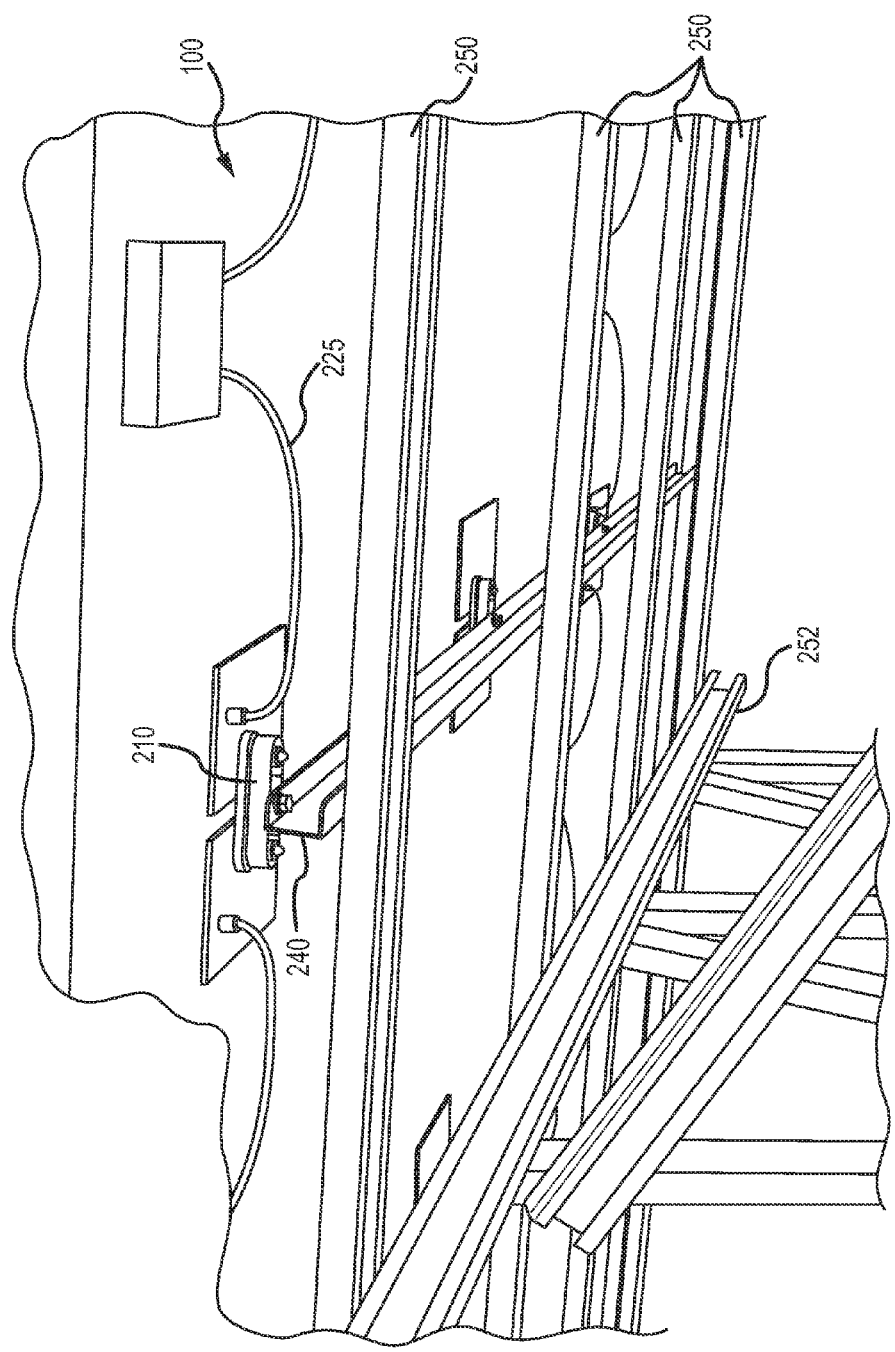
FIG. 15 is a lower perspective view of the mounting system of FIG. 13 as engaged with PV arrays and racks.

FIGS. 13-15 depict a mounting bracket according to another embodiment of the invention. Generally, FIGS. 13A-G provide a series of views of the mounting bracket 210, FIG. 14 depicts the mounting bracket 210 installed between a PV array/panel 100 and a rail 240, and FIG. 15 depicts the mounting bracket 210 installed between a PV array 100 and a rail 240 which is in turn connected to rack one 250 and rack two 252. Benefits of the mounting bracket 210 system of FIGS. 13-15 include rapid installation.

In one preferred embodiment, a standard-sized PV array 100, using a plurality of mounting brackets 210, may be installed in below one (1) minute; in a more preferred embodiment, in less than thirty (30) seconds, and in a most preferred embodiment, in less than twenty (20) seconds. Furthermore, the bracket 210 is configured such that when attached or engaged with a PV array 100, the PV array may be readily handled and/or moved so as to ease installation and/or decrease time of installation. Note that easier and/or quicker installation yields reduced costs, comprising labor costs and construction costs.

With reference to FIGS. 13A-H, bracket 210 comprises body 212 which comprises two fingered apertures 214 and one aperture 216. Each of fingered apertures 214 are configured to receive pin 218. Pin 218 comprises an upper threaded portion and a lower angled or bullet portion. The pin 218 press-fits or interference fits with fingers of fingered aperture 214 so as to initially spread the fingers before reaching a set position, which may be a locked position.

Bracket 210 may comprise a shelf 220 which comprises connector 222 and mount 226. Connector 222 comprises ends 224. Connector may be an electrical connector and may comprise a metal alloy so as to provide electrical communication.

With respect to FIG. 14, bracket 210 interconnects with PV array by way of pin 218. That is, pin 218 is affixed or attached to PV array 100 through the afore-mentioned threaded (upper) portion of pin 218. Alternatively, pin 218 may interconnect to PV array 100 through any means known to one skilled in the art, to include by press or interference fit. The bracket 210 is interconnected to rail 240 as enabled by aperture 216. That is, a connecting means, such as a pin or screw or bolt/nut combination is inserted through aperture 216 to secure bracket 210 to rail 240. Note that bracket 210 interconnects perpendicular to a pair of PV arrays, wherein each of two fingered apertures 214 connects to a separate PV array 100.

In the event of failure of or damage to a panel 100, it is very simple to remove a single panel 100 from the system by simply snapping the insert 106 out of the track 104, disconnecting the wiring and then replacing the damaged panel 100 with another new panel.

With respect to FIG. 15, bracket 210 is depicted interconnected with two PV arrays by way of pins 218. That is, each pin 218 is affixed or attached to a PV array 100 through the afore-mentioned threaded (upper) portion of pin 218. Alternatively, pin 218 may interconnect to a PV array 100 through any means known to one skilled in the art, to include by press or interference fit. The bracket 210 is interconnected to rail 240 as enabled by aperture 216. That is, a connecting means, such as a pin or screw or bolt/nut combination is inserted through aperture 216 to secure bracket 210 to rail 240. Rail 240 is interconnected or attached to rack one 250 which in turn is interconnected or attached to rack two 252. In one embodiment, rack one 250 is a purlin structure and rack two is a rafter structure.

In alternate embodiments, the bracket 210 is installed to racks comprising a fixed rack, a tracking rack, and a rack without rails 240 (as may be found on a residential rooftop). In other embodiments, the electrical connection and/or interfitting mechanical connections, as depicted in FIG. 15, are provided in any manner known to those skilled in the art. For example, for the mechanical connection, the shape could be square, rectangular, etc., and not simply round. In one embodiment, the rail is punched and fitted with a snap or expanding metal clip. In another embodiment, the bracket 210 is snap inserted into the rail from underneath the rail, which transfers any upward force directly into the rail while the module bracket could be fashioned to allow the module weight to be transferred directly into the rail versus into the bracket.

In one embodiment, one or more rails 240 are pre-wired on site or at the place of manufacture to enable cheaper and/or faster installation.

Figure 16B:
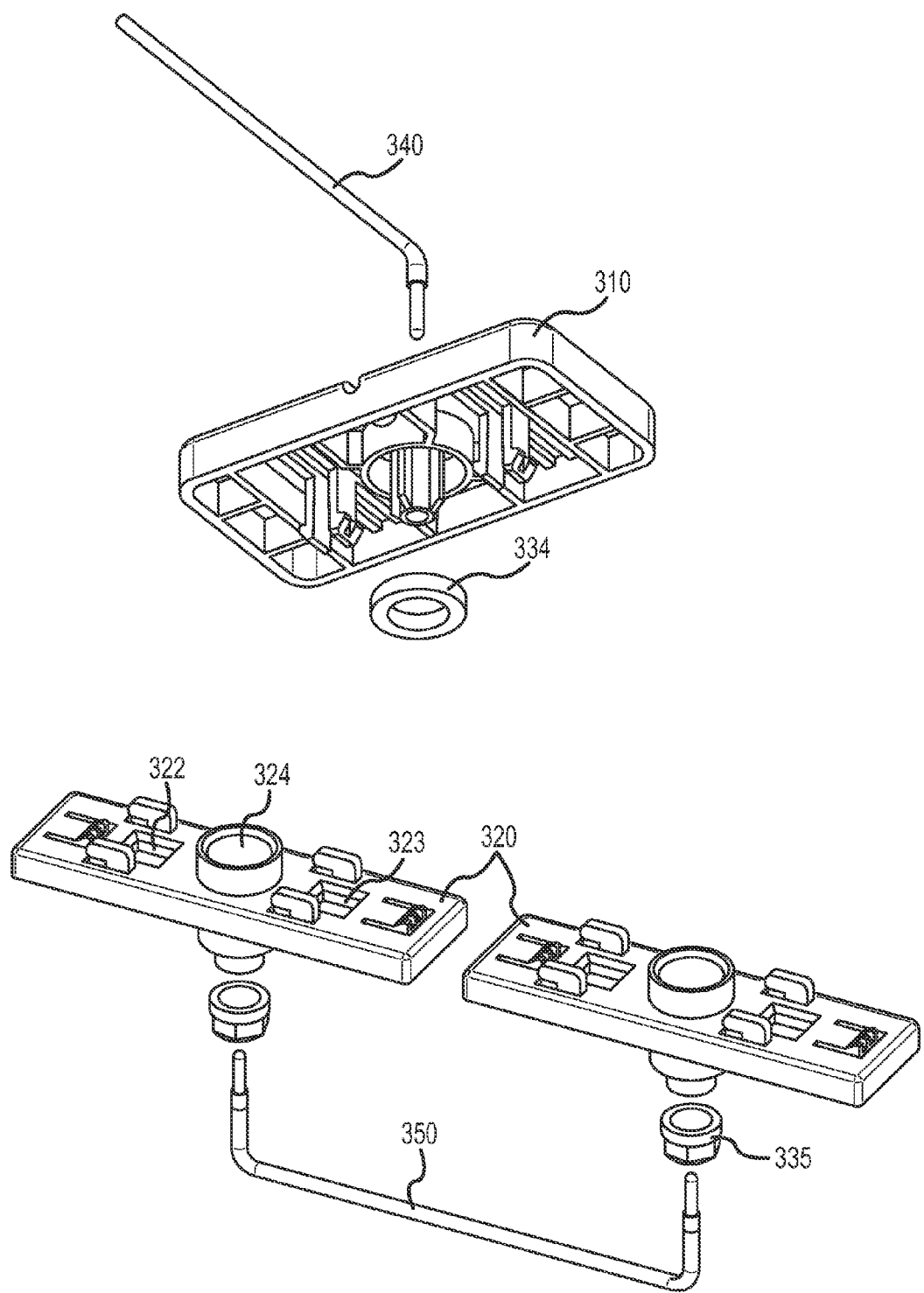
FIG. 16B is an exploded perspective view of details of the mounting system of FIG. 16A.

With reference to FIGS. 16A-B, another embodiment of a mounting system 300 for PV panels/arrays is depicted. This embodiment allows the mounting bracket to be installed directly into to rail and thus parallel to the rail. Such a "parallel bracket" configuration may allow for elimination of cross member rails, and thereby save costs. An additional benefit to the parallel bracket configuration is the enablement of tighter tolerances in the parallel direction.

Mounting system 300 comprises panel connector 310, purlin 360, panel connector receiver 320, female wire assembly 340 and male jumper cable 350. Panel connector 310 comprises arm one 312, arm two 313 and center arm 314. Panel connector receiver 320 comprises arm one aperture 322, arm two aperture 323 and center arm aperture 324. Purlin 360 comprises purlin one aperture 362, purlin two aperture 363 and purlin center aperture 364. Panel connector 310 interconnects with panel connector receiver 320 with purlin 360 between panel connector 310 and panel connector receiver 320. That is, each of arm one 312, arm two 313 and center arm 314 fit through respective purlin one aperture 362, purlin two aperture 363 and purlin center aperture 364 to engage or fit or interconnect with respective arm one aperture 322, arm two aperture 323 and center arm aperture 324. Gasket 334 fits or interconnects with center arm 314. Nut 335 engages lower portion of panel connector receiver. Male jumper cable 350 fits within or interconnects with nut 335. Female wire assembly 340 engages with upper portion of panel connector 310.

In one embodiment, the PV arrays interconnect with the bracket (e.g. bracket 210) by way of a screw, an adhesive, magnetism or any means known to those skilled in the art.

Accordingly, it can be seen that the present invention provides a mounting system for a PV array that is inexpensive, that is easy to install, that will allow relative movement of the panels and the membrane thus reducing damage to both the PV panels and the membrane, and that will allow the PV panels to be easily reconfigured, removed or replaced when needed.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

What is claimed is:

1. A system for mounting of a PV array, the system comprising:
    a plurality of mounting brackets comprising elastomeric materials or polymeric materials configured to be installed between a PV array and a rail, each one of said plurality of mounting brackets having a panel connector and a panel connector receiver;
    wherein the panel connector comprises a first arm, a second arm, and a center arm, each protruding from a lower surface of the panel connector, wherein the panel connector is configured to attach to a PV array at an upper surface of the panel connector,
    wherein the panel connector receiver comprises a first arm aperture, a second arm aperture and a center arm aperture, wherein a perimeter of the center arm aperture is configured to receive a cable or wire that protrudes from a lower surface of the panel connector receiver;
    wherein the first arm, second arm and center arm of the panel connector are each configured to be received in the respective first arm aperture, second arm aperture and center arm aperture of the panel connector receiver;
    wherein the first arm and the second arm of the panel connector are configured, when engaged with the respective first arm aperture and the second arm aperture of the panel connector receiver, to form one of: an interference fit, a connection means comprising a pin having an upper threaded portion and a lower angled or bullet portion; and a bolt and nut combination.

2. The system of claim 1 wherein the first arm and the second arm are configured to form an interference fit with the respective first arm aperture and the second arm aperture when engaged with the respective first arm aperture and the second arm aperture.

3. The system of claim 1 wherein a perimeter of the center arm aperture is configured to engage a nut.

4. The system of claim 1, wherein the perimeter of the center arm aperture is further configured to receive a jumper cable or wire.

5. The system of claim 1, wherein the plurality of mounting brackets are configured to interconnect to a longitudinal axis of a structural rack.

6. The system of claim 5, wherein the plurality of mounting brackets are configured to interconnect parallel to the longitudinal axis of a structural rack.

7. The system of claim 1, wherein the plurality of mounting brackets comprise elastomeric materials and polymeric materials.

8. The system as set forth in claim 1, wherein said plurality of brackets have a shelf which comprises a connector and a mount.

9. The system as set forth in claim 1, wherein the cable or wire comprises an electrical connector that comprises a metal alloy so as to provide electrical communication.

10. The system as set forth in claim 1, wherein said rail is adapted to be interconnected to a rack.

11. The system as set forth in claim 1, wherein the perimeter of the center arm aperture has a shape selected from the group consisting of a square, a rectangular, and a non-round shape.

12. The system as set forth in claim 1, wherein the rail has predetermined holes.

13. The system as set forth in claim 1, wherein the plurality of mounting brackets are configured to be snap inserted into the rail from underneath the rail.

14. The system as set forth in claim 1, wherein the rail is pre-wired.

15. The system as set forth in claim 1, wherein the plurality of mounting brackets are installed directly into the rail in a parallel relationship to the rail.

16. The system as set forth in claim 1, wherein the plurality of mounting brackets are installed perpendicular to a pair of PV arrays, with at least one of said plurality of mounting brackets connecting to separate PV arrays.

* * * * *